(12) United States Patent
Mäntylä

(10) Patent No.: US 10,969,343 B2
(45) Date of Patent: Apr. 6, 2021

(54) MEASURING METHOD, MEASURING ARRANGEMENT AND MEASURING DEVICE

(71) Applicant: VALMET AUTOMATION OY, Espoo (FI)

(72) Inventor: Markku Mäntylä, Kangasala (FI)

(73) Assignee: VALMET AUTOMATION OY, Espoo (FI)

( * ) Notice: Subject to any disclaimer, the term of this patent is extended or adjusted under 35 U.S.C. 154(b) by 219 days.

(21) Appl. No.: 16/316,327

(22) PCT Filed: Jul. 5, 2017

(86) PCT No.: PCT/FI2017/050508
§ 371 (c)(1),
(2) Date: Jan. 8, 2019

(87) PCT Pub. No.: WO2018/011465
PCT Pub. Date: Jan. 18, 2018

(65) Prior Publication Data
US 2019/0277768 A1    Sep. 12, 2019

(30) Foreign Application Priority Data

Jul. 13, 2016 (FI) ..................... 20165587

(51) Int. Cl.
*G01N 21/55* (2014.01)
*G01N 21/892* (2006.01)
(Continued)

(52) U.S. Cl.
CPC ......... *G01N 21/8422* (2013.01); *D21H 19/32* (2013.01); *G01B 11/30* (2013.01);
(Continued)

(58) Field of Classification Search
CPC ........ G01N 21/00; G01N 21/55; G01N 21/84; G01N 21/8422; G01N 21/89;
(Continued)

(56) References Cited

U.S. PATENT DOCUMENTS

| 4,250,382 A | * | 2/1981 | Libby | .................... G01N 21/64 250/302 |
| 5,084,354 A | * | 1/1992 | Krankkala | ........... D21H 19/824 427/515 |

(Continued)

FOREIGN PATENT DOCUMENTS

| EP | 1 980 398 A2 | 10/2008 |
| EP | 1 980 398 B1 | 6/2011 |

(Continued)

OTHER PUBLICATIONS

Oct. 16, 2017 Search Report issued in International Patent Application No. PCT/FI2017/050508.

(Continued)

*Primary Examiner* — Nguyen Q. Ha
(74) *Attorney, Agent, or Firm* — Oliff PLC

(57) ABSTRACT

A measuring method includes: illuminating a silicone-coated layer using a light source; and imaging light from the light source that is specularly reflected from the silicone-coated layer to form an image of a surface of the silicone-coated layer. The method further includes detecting pores and/or voids in a silicone coating of the silicone-coated layer from the image; determining a silicone coverage of the silicone-coated layer based on the detected pores and/or voids; and determining a release force of the silicone-coated layer based on the silicone coverage.

9 Claims, 1 Drawing Sheet

(51) Int. Cl.
  *G01N 21/84* (2006.01)
  *D21H 19/32* (2006.01)
  *G01B 11/30* (2006.01)
  *D21H 27/00* (2006.01)

(52) U.S. Cl.
  CPC ........... *G01B 11/303* (2013.01); *G01N 21/55* (2013.01); *D21H 27/00* (2013.01); *G01N 2021/8427* (2013.01)

(58) Field of Classification Search
  CPC ......... G01N 21/892; G01N 2021/8427; G01B 11/30; G01B 11/303; D21H 27/00; D21H 19/32
  See application file for complete search history.

(56) References Cited

U.S. PATENT DOCUMENTS

| | | | |
|---|---|---|---|
| 5,162,660 A | 11/1992 | Popil | |
| 5,807,781 A * | 9/1998 | Reinhardt | D21H 19/32 428/341 |
| 2005/0181118 A1 | 8/2005 | Janssen et al. | |
| 2006/0231226 A1 * | 10/2006 | Makinen | D21H 17/37 162/135 |
| 2009/0097033 A1 | 4/2009 | Kuusela | |
| 2014/0168304 A1 | 6/2014 | Mizes et al. | |
| 2015/0132471 A1 | 5/2015 | Hibbs et al. | |
| 2016/0178528 A1 | 6/2016 | Weimer et al. | |

FOREIGN PATENT DOCUMENTS

| | | |
|---|---|---|
| JP | 2009-229173 A | 10/2009 |
| WO | 00/20842 A1 | 4/2000 |
| WO | 00/31499 A1 | 6/2000 |
| WO | 2011/036347 A2 | 3/2011 |
| WO | 2014/068188 A1 | 5/2014 |

OTHER PUBLICATIONS

Oct. 16, 2017 Written Opinion issued in International Patent Application No. PCT/FI2017/050508.
Feb. 3, 2017 Search Report issued in Finland Patent Application No. 20165587.
Dec. 11, 2018 Search Report issued in Finland Patent Application No. 20165587.

* cited by examiner

MEASURING METHOD, MEASURING ARRANGEMENT AND MEASURING DEVICE

BACKGROUND OF THE INVENTION

The invention relates to a measuring method, measuring arrangement, and measuring device.

For example, when self-adhesive label laminate is produced, the release layer is coated with silicone. The purpose of silicone is to ensure the release of the self-adhesive label from the release layer, in other words the release force needs to be matched with the final purpose of use of the self-adhesive label laminate. On the other hand, silicone is a relatively expensive material, so the aim is to use as little of it as possible on the release layer.

It is possible to measure rather precisely the amount of silicone on the release layer by measuring methods that are based on infrared spectroscopy or x-ray fluorescence spectroscopy, for example. However, the amount of silicone does not in all cases correlate with the release force accurately enough. Consequently, in addition to measuring the amount of silicone, it is necessary to determine silicone coverage. Silicone coverage is determined by means of a so-called dye stain test. In a dye stain test, a colourant is spread on a silicone-coated release layer for a specific time. After the colourant has been removed, the penetration of the colourant into the release layer is measured by observing the colour difference between a dyed and undyed product.

A dye stain test has to be carried out as a laboratory measurement, which often results in a very long delay with the production process control in mind, and covers a small part of the manufactured product, only. A dye stain test is also quite laborious, cumbersome, and slow. Thus, the need exists for an improved measuring solution to determine silicone coverage.

BRIEF DESCRIPTION OF THE INVENTION

The solution according to the invention is characterized by what is disclosed in the independent claims. Some embodiments are presented in the dependent claims.

In the disclosed solution, a silicone-coated layer is illuminated with a light source. Further, imaging is used to observe in the silicone-coated layer the light originating from the light source, reflected by specular reflection. From the image observed by imaging, the coverage of the silicone coating is analysed. As a result, silicone coverage may be measured in a simple, fast, and reliable way. The measuring result may be used, for example, to optimise the amount of silicone, in which case as little silicone as possible is arranged on a release layer, for example, but on the other hand enough so that silicone coverage is at an adequately good level and the desired level of release force is achieved.

The idea of an embodiment is that in the analysis, pores and/or voids in the silicone coating are detected in the image, and based on the number of the pores and/or voids, their size distribution, proportion of surface area, or another similar property, the silicone coverage is determined. Such a solution corresponds rather well with the end result of the dye stain test described in the above, whereby this solution is easily adaptable for use and its reliability may be easily verified.

BRIEF DESCRIPTION OF THE FIGURES

The invention is described in more detail in the accompanying drawings, in which.

DETAILED DESCRIPTION OF THE INVENTION

Figure 1:
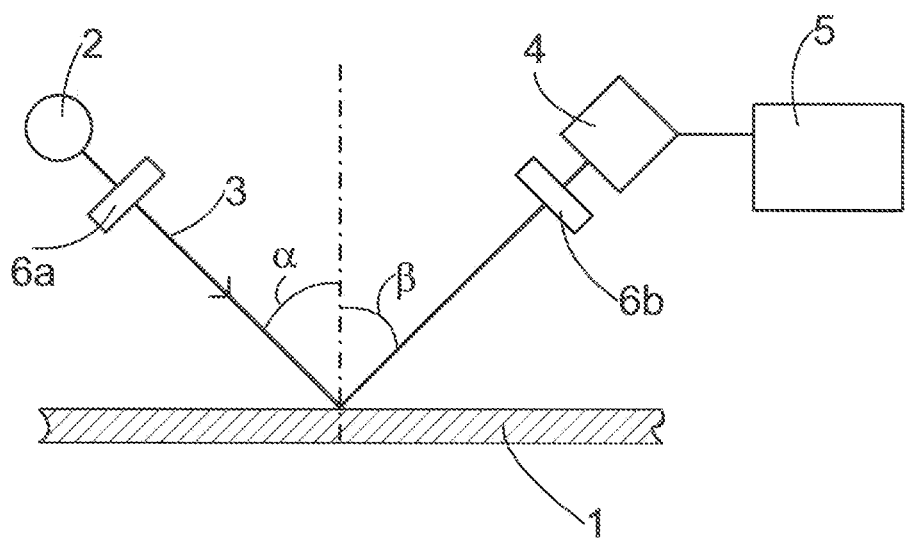
FIG. 1 is a schematic side view of the measuring arrangement.

FIG. 1 shows a silicone-coated layer 1, which is observed by imaging.

The layer 1 may be a release paper coated with silicone, or another silicone-coated paper. Further, the layer 1 may be a silicone-coated release layer out of plastic. Such a release layer may be of polyethylene terephthalate, PET. The layer 1 may be stationary during the measurement. The layer 1 may be, for example, a sheet or a piece of silicone-coated web. In such a case, the measurement may be carried out in a measuring laboratory, for example. Further, the layer 1 may be a moving web, in which case the measurement is performed as an on-line measurement. In such a case, the measuring arrangement is arranged in connection with a siliconizing self-adhesive label laminate machine, a dedicated siliconizing coating machine, or a paper machine coating with silicone to measure the properties of a moving web.

The measuring arrangement includes a light source 2. The light source 2 is adapted to generate a beam of light at the angle $\alpha$ in relation to the normal of the layer 1. The light source 2 may generate visible light in the range 400 nm to 750 nm, for example. The light source may also generate light at wavelengths outside of visible light, such as in the ultraviolet range or infrared range. The light source 2 may comprise one or more incandescent lamps, halogen lamps, gas-discharge lamps, LED (light emitting diode), laser or a combination of the above, or the like.

The wavelength of the light source 2 is preferably adapted to the sensitivity range of the imaging measuring device 4. Further, the light source 2 may be collimated. The light source 2 may be a diffuse surface which is imaged as a specular reflection through a shiny surface. The illumination generated by the light source 2 may be continuous or pulsed. Continuous illumination is well suited for use in laboratory measurements whereas pulsed illumination may be used in on-line measurements, in particular.

The measuring arrangement further includes an imaging measuring device 4. The imaging measuring device 4 is arranged to observe, by imaging, a beam of light 3 reflected from a target by specular reflection and thus to form a specular image of the target. The imaging measuring device 4 is arranged at the angle $\beta$ in relation to the normal of the layer 1 being observed. Because the imaging measuring device 4 is arranged to observe light reflected as specular reflection, the angles $\alpha$ and $\beta$ are substantially equal. The magnitude of the angles $\alpha$ and $\beta$ may be in the range 10°-80°, for example.

The imaging measuring device 4 may be a camera, such as a CMOS camera or a CCD camera. The camera optics is adapted in such a manner that an adequate range of depth of field at the required resolution is obtained on the surface of the 2D cell of the camera, when imaging from the desired angle $\beta$.

The imaging measuring device 4 forms an image of the desired size of the surface of the layer 1. The size of the image may be 10 mm times 10 mm, for example.

The measuring arrangement further includes a processing unit 5. The processing unit 5 may be a part of the imaging measuring device 4 or a separate unit. The processing unit 5 may be a computer. The processing unit 5 may comprise at least one processor, memory, and at least one suitable computer program to carry out the one or more functions disclosed in connection with this description. The processing unit 5 is adapted to analyse the image formed by the imaging measuring device. The processing unit 5 is adapted to analyse the silicone coverage from the image observed by imaging.

The processing unit 5 may be adapted to detect pores and/or voids in the silicone coating from the image. A void in the silicone coating may be an unsiliconized area on the surface of the layer 1, for example. A void or pore in the silicone coating may be caused by an air bubble in the coating paste, for example. A pore and/or void may be defined to be, for example, the spots that show an intensity level below a specific threshold level. Further, for defining a pore and/or a void, a low level of intensity in a specific area may be used. The processing unit 5 is capable of defining the number of pores and/or voids in a specific surface area, for example. On the other hand, the size and size distribution of pores and/or voids can be determined. Further, the proportion of pores and/or voids in a surface area can be determined.

The processing unit 5 may be adapted to analyse the silicone coverage and/or evenness from the image also so that the processing unit 5 determines the spectral power of the machine direction/cross machine direction (MD/CD directions) at the selected wavelengths. Further, the processing unit 5 may determine the standard deviation of the MD/CD directions at the selected wavelengths. Further, the processing unit may be adapted to analyse the silicone coverage from the image by using another image analysing method and by applying another statistical parameter.

The measuring device and measuring arrangement may further still have a polarizer 6a between the light source and layer 1, and or polarizer 6b between the layer 1 and imaging measuring device 4. The polarizers 6a and 6b may be horizontal polarizers, for example. A horizontal polarizer emphasizes the specular reflection of a surface. By changing the polarisation angles, the proportion or the specular component may be varied, which enables a change in the ratio between a specular reflection and diffuse reflection.

Figure 2:
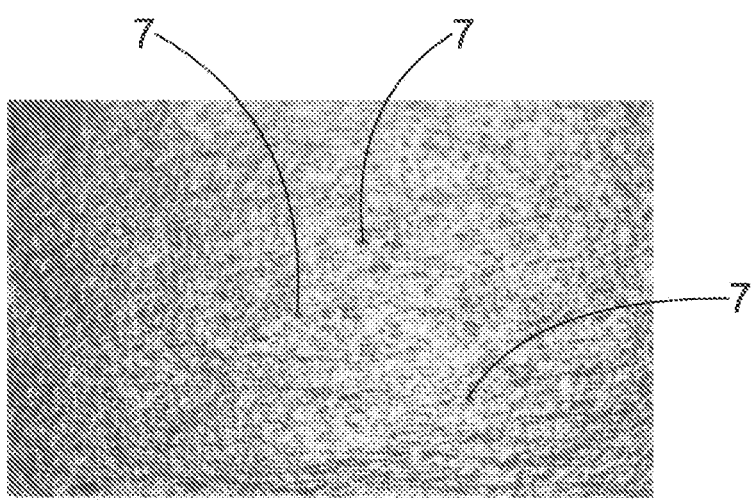
FIG. 2 is an image of a specular surface of a siliconized paper.

FIG. 2 is an image of a specular surface of a siliconized paper. Reference number 7 in FIG. 2 illustrates some pores in the silicone coating. By a dye stain test, in which a colourant is spread on a siliconized release layer for a specific time, and after the colourant has been removed, the penetration of the colourant into the release layer is observed, for example, by measuring the colour difference between a dyed and undyed product, a corresponding result as the one shown in FIG. 2 is achieved. Therefore, the disclosed measuring solution may be made to correlate rather well with the dye stain test. This way, silicone coverage may be determined similarly to a dye stain test, and the release force may further be determined. So, with the disclosed measuring solution, similar information on the release force as from the cumbersome and long-lasting dye stain test can be obtained. The disclosed measuring solution thus produces information on the quality of the product faster, and consequently any repair measures required may be implemented faster.

The measurement of silicone coverage may be carried out even on a production machine in the on-line fashion, allowing a direct feedback to adjusting the amount of silicone. The measurement result of silicone coverage may be used to determine the set value of the regulator of silicone amount.

The on-line measurement may be performed either from a fixed point in relation to the cross direction of the production machine, or as a conventional traversing measurement. The traversing measurement allows both a machine direction (MD) trend and a cross direction (CD) profile to be produced from the calculated variables.

The pores and/or voids to be detected are typically a few tens of micrometres in size. So, if the resolution of an imaging measurement is in the order of 5 µm, for example, rather a good end result is obtainable.

If the layer 1 is a moving web, the light source 2 and/or imaging measuring device 4 may be controlled with the technologies disclosed in the publication WO 2014/068188, for example. This way, adequately sharp images are obtained from a moving web, too. It may be noted, by way of example, that if the web is moving at the speed of 15 m/s, so 900 m/min, and an image resolution in the order of 10 µm is desired, the duration of illumination/detection must be in the order of 1 µs for an adequately sharp image to be obtained from the moving web.

Figure 3:
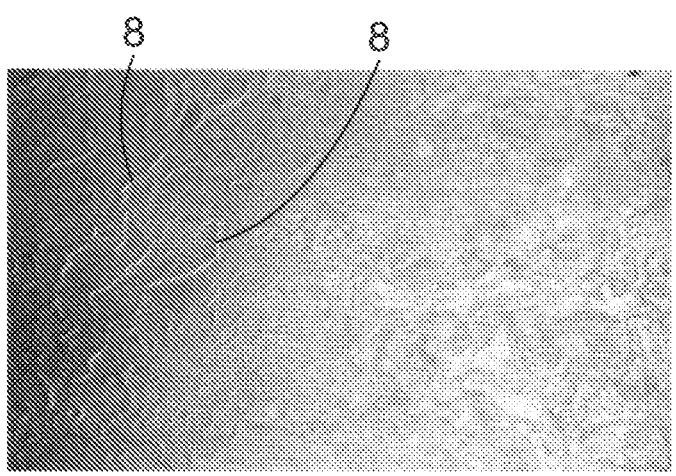
FIG. 3 is an image of a specular surface of a siliconized plastic sheet.

FIG. 3 shows a specular reflection of a silicone-coated PET foil imaged with the method described in the above. A corresponding colour image would show the variation of the silicone layer thickness as a local colour difference based on the interference phenomenon, known per se. Reference number 8 in FIG. 3 illustrates the unevenness in the silicone surface.

The evenness of the silicone surface may be affected by the properties of the coating, properties of the drying/hardening process, surface energy of the PET foil, or the evenness of the surface of the PET foil. Likewise, the evenness of the silicone surface may be affected by the properties of the silicone and reacting substances and/or their quantity.

So, on the basis of an interference image, the thickness of the silicone layer, the evenness of the silicone layer, and the evenness of the surface of the PET foil may be determined. The surface structure of a mere unsiliconized PET foil does not show in, for example, a corresponding interference pattern captured from the surface of the unsiliconized PET foil, because the interference pattern referred to in this context is formed of a silicone layer having a thickness in the order of 0.1 to 1 µm.

If the roughness of the silicone surface is caused by the surface energy of the PET foil, the surface may be modified with corona treatment, for example. This being the case, the corona treatment may be controlled on the basis of the interference pattern.

The contrast of the interference pattern may be improved under laboratory conditions, for example, by painting the back of the PET foil black, which removes the boundary surface reflection from the uncoated side.

A measuring arrangement corresponding to the measuring arrangement disclosed in this description may be applied in connection with another coated layer than a silicone-coated layer. The coverage of another coating than a silicone coating may thus be measured. The target of application may therefore be determining the coverage of a plastic coating of plastic-coated paper or board, for example. The plastic coating may be polyethylene, for example. Further, the coating may be lacquer, wax, or similar. So the coated layer may be a wax-coated photographic cardboard or lacquer-coated printed matter, for example.

A person skilled in the art will find it obvious that, as technology advances, the basic idea of the invention may be implemented in many different ways. The invention and its embodiments are thus not restricted to the above-described examples but may vary within the scope of the claims.

The invention claimed is:

1. A measuring method comprising:
    illuminating a silicone-coated layer using a light source;
    imaging light from the light source that is specularly reflected from the silicone-coated layer to form an image of a surface of the silicone-coated layer;
    detecting pores and/or voids in a silicone coating of the silicone-coated layer from the image;
    determining a silicone coverage of the silicone coating based on the detected pores and/or voids; and
    determining a release force of the silicone-coated layer based on the silicone coverage of the silicone coating.

2. The method as claimed in claim 1, wherein the silicone-coated layer is a moving web.

3. The method as claimed in claim 1, wherein the silicone-coated layer is a silicone-coated paper.

4. The method as claimed in claim 2, wherein the silicone-coated layer is a silicone-coated paper.

5. A measuring arrangement comprising:
    a silicone-coated layer;
    a light source configured to direct a beam of light to a surface of the silicone-coated layer at a desired angle;
    an imaging measuring device configured to form an image of a specular reflection surface of the silicone-coated layer; and
    a processor programmed to:
        detect pores and/or voids in a silicone coating of the silicone-coated layer from the image;
        determine a silicone coverage of the silicone coating based on the detected pores and/or voids; and
        determine a release force of the silicone-coated layer based on the silicone coverage of the silicone coating.

6. The arrangement as claimed in claim 5, wherein the silicone-coated layer is a moving web.

7. The arrangement as claimed in claim 5, wherein the silicone-coated layer is a silicone-coated paper.

8. The arrangement as claimed in claim 6, wherein the silicone-coated layer is a silicone-coated paper.

9. A measuring device comprising:
    a light source configured to direct a beam of light to a surface of a silicone-coated layer at a desired angle;
    an imaging measuring device, adapted configured to form an image of a specular reflection surface of the silicone-coated layer; and
    a processor programmed to:
        detect pores and/or voids in a silicone coating of the silicone-coated layer from the image;
        determine a silicone coverage of the silicone coating based on the detected pores and/or voids; and
        determine a release force of the silicone-coated layer based on the silicone coverage of the silicone coating.

* * * * *